United States Patent [19]

Terry

[11] 4,453,037
[45] Jun. 5, 1984

[54] LOOP LENGTH COMPENSATION CIRCUIT

[75] Inventor: Michael B. Terry, Denton, Tex.

[73] Assignee: Mostek Corporation, Carrollton, Tex.

[21] Appl. No.: 335,142

[22] Filed: Dec. 28, 1981

[51] Int. Cl.³ .................................................. H04B 3/36
[52] U.S. Cl. .................................. 179/16 F; 179/81 B; 323/315
[58] Field of Search .............. 179/16 F, 16 AA, 81 R, 179/81 A, 170 R, 81 B; 323/315, 316

[56] References Cited

U.S. PATENT DOCUMENTS 3,781,481 12/1973 Shaffer et al. ..................... 179/16 F
4,007,340 2/1977 Russell .......................... 179/16 F X Primary Examiner—A. D. Pellinen
Assistant Examiner—James L. Dwyer

[57] ABSTRACT

A compensation circuit (10) controls the gain of transmit and receive amplifiers (47), (49) as a function of a residual input current ($I_{res}$). Circuit (10) includes a constant current source (24) which is connected to produce mirrored constant currents in transistors (26) and (28). The residual current is passed through a resistor ($R_{loop}$) to produce a reference voltage. The constant current from the transistor (26) is divided with the first part of the current passing through the resistor ($R_{loop}$) and the second part of the current passing through a resistor (50) and a transistor (54). The transistor (54) is connected in a mirror configuration with a transistor (58). When the residual current increases, the current mirrored to transistor (58) decreases. A transistor (32) is connected in parallel with the transistor (58) to receive the remaining current from the transistor (28) which is not drawn by the transistor (58). The transistor (32) serves as the master side of a mirror circuit having slave transistors (38) and (42). The current mirrored to the transistors (38), (42) is drawn from the amplifiers (47), (49) wherein the current through the amplifiers is proportional to the gain thereof. Thus, the gain of the amplifiers is inversely proportional to the residual current thereby compensating the amplifier gain for the length of the telephone line.

5 Claims, 1 Drawing Figure

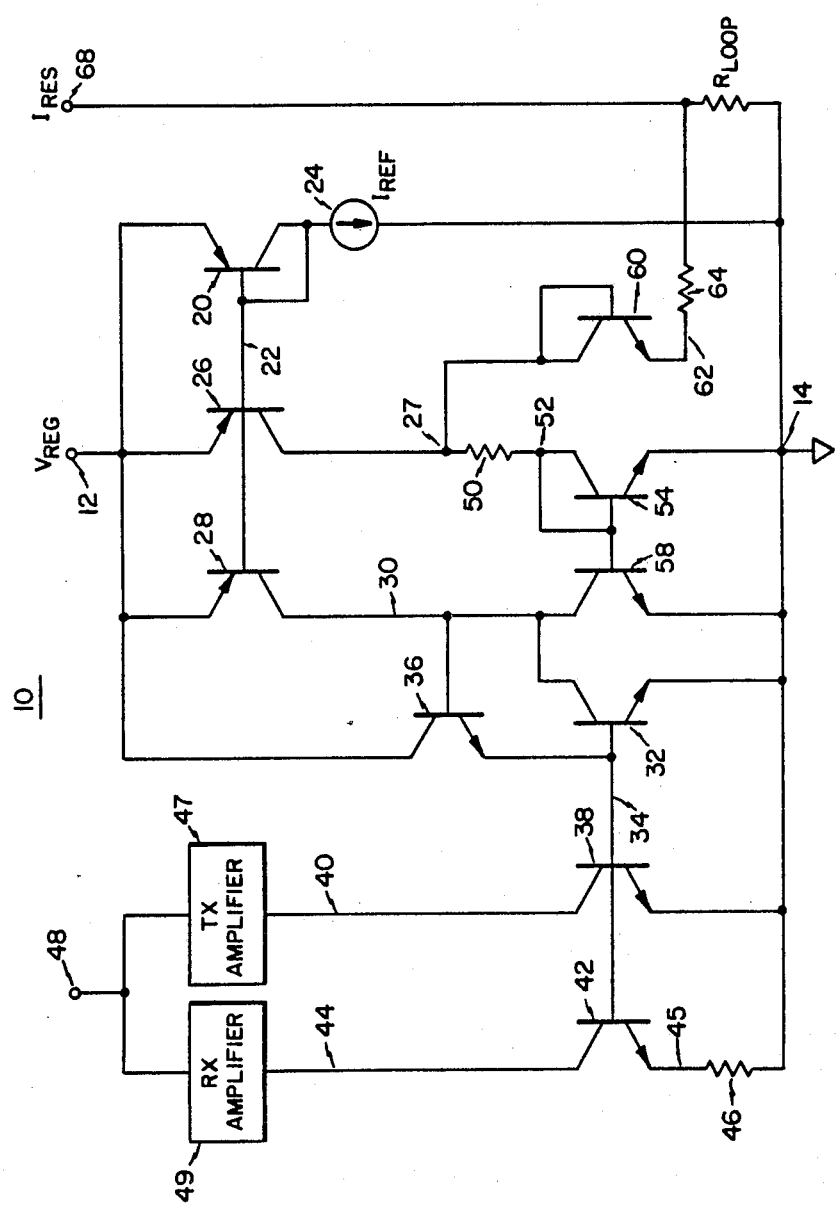

4,453,037

LOOP LENGTH COMPENSATION CIRCUIT

TECHNICAL FIELD

The present invention pertains to compensation circuits and more particularly to a loop length compensation circuit for use in a telephone system.

BACKGROUND OF THE INVENTION

It is required for telephone systems in the United States that signals received from a telephone subscriber at a central office have a set amplitude. Depending upon the length of the transmission line loop from the central office to the subscriber's location, the current available to the subscriber varies due to the intrinsic impedance of the line itself. This varies the power provided to the subscriber. As the impedance of the line increases, for example, when the subscriber is located a substantial distance from the central station, the subscriber's transmitting circuit must have a higher gain to compensate for the increased telephone line impedance. The increased line impedance also requires increased gain for the subscriber's receiving circuit.

The telephone central office applies a fixed voltage, typically 48 volts, to each subscriber loop and the current provided through the line is therefor a function of the length of the line. This current ranges from approximately 20 to 100 milliamps. Therefore the subscriber's telephone circuit must be able to function with as little as 20 milliamps for a long line but must also be able to operate with as much as 100 milliamps for a short line.

Since the central office does not compensate gain for subscribers and in view of the requirement that the subscriber provide a set amplitude signal to the central office, there exists a need for a circuit to compensate amplifier gain at the subscriber circuit as a function of loop length.

SUMMARY OF THE INVENTION

A selected embodiment of the present invention comprises a circuit for controlling the gain of an amplifier as a function of a residual loop current. Circuitry is provided for monitoring the residual loop current to produce a control current which is inversely proportional to the residual loop current. Further circuitry is connected to receive the control current for controlling the gain of the amplifier in proportion to the control current.

BRIEF DESCRIPTION OF THE DRAWINGS

For a more complete understanding of the invention and the advantages thereof, reference is now made to the following description taken in conjunction with the accompanying FIGURE in which the FIGURE is a schematic illustration of a circuit for providing gain compensation as a function of residual loop current.

DETAILED DESCRIPTION OF THE INVENTION

Referring to the FIGURE, there is shown a schematic diagram of a gain compensation circuit 10. The circuit 10 includes a regulated positive supply voltage, denoted as $V_{reg}$ at a terminal 12, and a negative power supply terminal 14 that serves as a circuit ground (hereinafter denoted GND).

A PNP transistor 20 has the emitter terminal thereof connected to the $V_{reg}$ terminal 12, the base terminal thereof connected to a node 22 and the collector terminal thereof connected to the node 22. A current source 24 is connected between the collector terminal of the transistor 20 and the GND terminal 14. The current through the current source 24 is denoted as $I_{ref}$ and flows from the collector of the transistor 20 to the GND terminal 14.

A PNP transistor 26 has the emitter terminal thereof connected to the $V_{reg}$ terminal 12, the base terminal thereof connected to the node 22 and the collector terminal thereof connected to a node 27. A PNP transistor 28 has the emitter terminal thereof connected to the $V_{reg}$ terminal 12, the base terminal thereof connected to the node 22 and the collector terminal thereof connected to a node 30. The transistors 20, 26 and 28 comprise a current mirror with the transistor 20 acting as the master side of the current mirror and the transistors 26 and 28 serving as the slave sides of the current mirror.

The transistor 26 is fabricated such that its emitter-to-collector current is twice the current through the current source 24. Similarly, the transistor 28 is fabricated such that its emitter-to-collector current is three times the current through the current source 24. Thus, the transistors 26 and 28 comprise constant current sources producing currents which are a multiple of the current through the reference source 24.

An NPN transistor 32 has the collector terminal thereof connected to the node 30, the emitter terminal thereof connected to the GND terminal 14 and the base thereof connected to a node 34. An NPN transistor 36 has the collector terminal thereof connected to the $V_{reg}$ terminal 12, the base terminal thereof connected to the node 30 and the emitter terminal thereof connected to the node 34. An NPN transistor 38 has the collector terminal thereof connected to a terminal 40, the base terminal thereof connected to the node 34 and the emitter terminal thereof connected to the GND terminal 14. An NPN transistor 42 has the collector terminal thereof connected to a terminal 44, the base terminal thereof connected to the node 34 and the emitter terminal thereof connected to a node 45. A resistor 46 is connected between the node 45 and the GND terminal 14.

A transmit amplifier circuit 47 has one terminal thereof connected to terminal 40 and another terminal thereof connected to a power receiving terminal 48. A receive amplifier circuit 49 has one terminal thereof connected to the terminal 44 and another terminal thereof connected to the terminal 48. The gain of amplifier circuits 47 and 49 is controlled by the current flowing through the amplifiers to the GND terminal 14. For example, the gain of a differential amplifier can be adjusted by varying the series current through the amplifier. The terminal 48 is connected to a power supply to provide a source of current to the amplifier circuits 47 and 49. By regulating the current through the transistors 38 and 42, the gain of the amplifier circuits 47 and 49 can be controlled.

The transistor 32 comprises the master side of a current mirror while the transistors 38 and 42 comprise the slave sides of the current mirror. The current flowing through the collector and the emitter of the transistor 32 is mirrored to the transistors 38 and 42 such that the transistors 38 and 42 comprise current sources. The transistor 36 is incorporated into the current mirror to allow the transistor 32 to mirror current to a plurality of slave transistors without diminishing the capacity of the master side of the current mirror to supply sufficient base current to the slave transistors.

The resistor 46 in series with the emitter of the transistor 42 allows the current through the transistor 32 to be mirrored at less than a one-to-one ratio. Normally, the emitter areas of the transistors in a current mirror determine the ratio of the current in the slave transistor to the current in the master transistor, but when a resistor such as 46 is added, this is no longer true.

A resistor 50 is connected between node 27 and a node 52. An NPN transistor 54 has the collector terminal thereof connected to the node 52, the base terminal thereof connected to node 52 and the emitter terminal thereof connected to GND terminal 14. An NPN transistor 58 has the collector terminal thereof connected to the node 30, the base terminal thereof connected to the node 52 and the emitter terminal thereof connected to the GND terminal 14. The transistors 54 and 58 comprise a current mirror and the current flowing through the resistor 50 to the node 52 is mirrored over to the transistor 58. The transistor 58 draws current from the node 30 and sinks this current to the GND terminal 14.

An NPN transistor 60 has the collector and base terminals thereof connected to the node 27 and the emitter terminal thereof connected to a node 62. The transistor 60 is configured as a diode. A resistor 64 connected between the node 62 and a node 68. A sensing resistor $R_{loop}$ is connected between the node 68 and the GND terminal 14. A terminal 68 is connected to the node 66 and receives a residual current, $I_{res}$.

Referring further to the FIGURE, the operation of the present invention is described in detail. The current flowing from the $V_{reg}$ terminal 12 to the node 30 is divided at the node 30 between the transistors 32 and 58. The current that flows through the collector and emitter of the transistor 32 is mirrored to each of the transistors 38 and 42. It should be understood that additional transistors can be slaved off of the transistor 32. The remaining portion of the current to the node 30 is directed through the collector and emitter of the transistor 58. Since the transistor 58 is the slave side of a current mirror having the transistor 54 as the master side of the current mirror, the current through the transistor 58 is dependent upon the current through the transistor 54. By varying the current through the transistor 54 the proportion of the current that flows through the node 30 to the transistor 32 can be adjusted.

The current that flows through the node 27 is divided between the path comprising the resistor 50 and the transistor 54, and the path comprising the transistor 60, the resistor 64 and the resistor $R_{loop}$. By adjusting the current that flows through transistor 60, the current that flows through the transistor 54 can be adjusted. As described above, this also adjusts the current that flows through the transistor 32, thus controlling the current through the transistors 38 and 42.

The path comprising the resistor 50 and the transistor 54 is essentially a series connected resistor and diode. In a similar manner, the path comprising the transistor 60, the resistor 64 and the resistor $R_{loop}$ is also a series connected resistor and diode. By selecting the impedances of resistors 50, 64 and $R_{loop}$, the ratio of the current flow between the two paths is essentially linear. However, due to the emitter-base junctions of the transistors 54 and 60, there is a slight logarithmic relationship.

An important aspect of the present invention is the method employed to adjust the current through the transistor 60. As the distance from the central office varies, the loop current available to the subscriber may vary from approximately 20 to 100 milliamps. However, the subscriber's device does not normally require 20 milliamps and may, in fact, only require a small portion of the available 20 milliamps. The remaining fraction of the current is residual and is merely discarded or dissipated elsewhere. This residual current is termed in the present invention as $I_{res}$ and is injected into the terminal 68. The voltage on the input terminals of the subscriber's circuit is typically about 4.9 volts which allows sufficient current to flow through the loop for the central office to recognize an operative device. Although all of the current drawn may not be needed to operate the subscriber device, current must be drawn from the telephone loop for recognition of the initiation of a call.

At shorter distances from the central office, the loop current increases due to the lower impedance of the shorter telephone line, thus increasing the residual current and therefore increasing the voltage drop across $R_{loop}$. With a greater voltage across $R_{loop}$, the current through the resistor 64 decreases, thus forcing more current through the resistor 50 to the transistor 54. This in turn increases the current in the transistor 58 drawing a larger portion of the current that passes through the node 30. This action in turn decreases the current through the transistor 32, thus decreasing the current through the transistors 38 and 42. As described above, the terminals 40 and 44 are connected to circuits such as amplifiers 47 and 49. Normally, when the current through an amplifier is decreased, the gain also decreases. This is the case for amplifiers 47 and 49. The result is that when the loop current increases, for a short, low impedance telephone line, the gain of amplifiers such as 47 and 49 is decreased. Therefor, when the loop is short and the impedance is low, the resulting residual loop current automatically decreases the gain of the amplifier.

For a long loop length, $I_{res}$ decreases, thus decreasing the voltage drop across $R_{loop}$. This in turn causes the resistor 64 and the transistor 60 to draw more current, thus drawing a larger portion of the current from the transistor 26. This reduces the current to the resistor 50 and the transistor 54, thus decreasing the current mirrored to the transistor 58. When the current through the transistor 58 decreases and draws a smaller portion of the constant current supplied by the transistor 28, this increases the current which passes through the transistor 32, thus increasing the current through the transistors 38 and 42. In a similar manner to that described above, the amplifiers connected to terminals 40 and 44 have an increase in gain. The result is that for a long telephone line with a high impedance, the gain of amplifiers 47 and 49 connected to terminals 40 or 44, increases to compensate for the increased impedance of the longer line.

In summary, the impedance of a telephone line is proportional to the length of the line and the current through the line is inversely proportional to its length. The subscriber's circuit shunts a residual current which is also inversely proportional to the loop length. This residual current is reflected through current mirror circuits to produce inverse control currents for determining the gain of amplifiers which transmit and receive audio signals through the telephone line.

Although the preferred embodiment of the invention has been described in detail, it should be understood that various changes, substitutions and alterations can be made therein without departing from the spirit and scope of the invention as defined by the appended claims.

I claim:

1. A circuit for controlling the gain of an amplifier as a function of a residual loop current, comprising:
   a first current source for producing a first current which is essentially constant;
   means connected to said first current source and coupled to monitor said residual loop current for drawing a second current from said first current;
   means connected to said first current source for receiving a third current from said first current, said first current essentially equal to the sum of said second and said third currents;
   a second current source for producing a fourth current which is essentially constant;
   means connected to said means for receiving a third current and to said second current source for drawing a fifth current from said fourth current, said fifth current porportional to said third current;
   means connected to said second current source for receiving a sixth current from said fourth current, said fourth current essentially equal to the sum of said fifth current and said sixth current; and
   means connected to said amplifier and responsive to said sixth current for controlling the gain of said amplifier.

2. A circuit for controlling the gain of an amplifier as a function of a residual loop current, comprising:
   a first current source for producing a first current which is essentially constant;
   means coupled to monitor said residual loop current for drawing a second current from said first current source, said second current inversely proportional to said residual loop current;
   a second current source for producing a third current which is essentially constant;
   a current mirror circuit having first and second transistors connected respectively to said first and said second current sources, said first transistor receiving a fourth current, said first current essentially equal to the sum of said second and said fourth currents, said second transistor drawing a fifth current from said third current; and
   a second current mirror circuit comprising a master transistor connected to said second current source for receiving a sixth current from said third current, said third current essentially equal to the sum of said fifth current and said sixth current, said second current mirror circuit including a slave transistor connected to control the current through said amplifier to determine the gain thereof.

3. A circuit for controlling the gain of an amplifier as a function of a residual loop current which passes through a loop resistor, comprising:
   a reference current source for producing a reference current;
   a first current mirror circuit having a master first transistor which passes said reference current therethrough and having slave second and third transistors which pass respective mirrored first and second currents therethrough;
   means connected between said second transistor and said loop resistor for passing a third current therethrough wherein said third current is inversely proportional to said residual loop current;
   a second current mirror circuit having a master fourth transistor coupled to said second transistor for passing a fourth current therethrough wherein said first current is essentially equal to the sum of said third current and said fourth current, said second current mirror circuit having a slave fifth transistor coupled to said third transistor for passing a fifth current therethrough; and
   a third current mirror circuit having a master sixth transistor coupled to said third transistor for passing a sixth current therethrough wherein said sixth current is essentially equal to the sum of said fifth current and said sixth current, said third current mirror circuit having a slave seventh transistor connected to control the current flow through said amplifier thereby controlling the gain of said amplifier.

4. A circuit for controlling the gain of transmit and receive amplifiers as a function of a residual loop current which passes through a loop resistor, comprising:
   first and second power terminals;
   a first transistor having the emitter terminal thereof connected to said first power terminal and the base and collector terminals thereof connected to a first node;
   a reference current source connected between said first node and said second power terminal;
   a second transistor having the emitter terminal thereof connected to said first power terminal, the base terminal thereof connected to said first node and the collector terminal thereof connected to a second node;
   a third transistor having the emitter terminal thereof connected to said first power terminal, the base terminal thereof connected to said first node and the collector terminal thereof connected to a third node;
   a fourth transistor having the collector and base terminals thereof connected to said second node;
   a first resistor connected between the emitter terminal of said fourth transistor and a first terminal of said loop resistor;
   a second resistor connected between said second node and a fourth node;
   a fifth transistor having the collector and base terminals thereof connected to said fourth node and the emitter terminal thereof connected to said second power terminal;
   a sixth transistor having the collector terminal thereof connected to said third node, the base terminal thereof connected to said fourth node and the emitter terminal thereof connected to said second power terminal;
   a seventh transistor having the collector terminal thereof connected to said first power terminal, the base terminal thereof connected to said third node and the collector terminal thereof connected to a fifth node;
   an eighth transistor having the collector terminal thereof connected to said third node, the base terminal thereof connected to said fifth node and the emitter terminal thereof connected to said second power terminal;
   a ninth transistor having the collector terminal thereof connected serially with said transmit amplifier, the base terminal thereof connected to said fifth node and the emitter terminal thereof connected to said second power terminal;

a tenth transistor having the collector terminal thereof connected serially with said receive amplifier and the base terminal thereof connected to said fifth node; and a third resistor connected between the emitter terminal of said tenth transistor and said second power terminal.

5. A method for controlling the gain of an amplifier as a function of a residual loop current, comprising the steps of:

generating an essentially constant first current;
generating an essentially constant second current;
drawing a third current from said first current leaving a remaining fourth current received from said first current, said third current inversely proportional to said residual loop current;
mirroring said fourth current to draw a fifth current from said second current leaving a remaining sixth current received from said second current;
mirroring said sixth current to produce a seventh current which is drawn from said amplifier wherein the gain of said amplifier is proportional to said seventh current and inversely proportional to said residual loop current.

* * * * *